United States Patent

Chene et al.

[11] Patent Number: 5,327,618
[45] Date of Patent: Jul. 12, 1994

[54] HOSE CLAMP INCORPORATING TIGHTENING SCREW

[75] Inventors: Richard Chene, Mennetou sur Cher; Pierre Dupin, Romorantin Lanthenay; Covello Fabienne, Romorantin, all of France

[73] Assignee: Etablissements Caillau, France

[21] Appl. No.: 64,757

[22] Filed: May 19, 1993

[30] Foreign Application Priority Data

May 22, 1992 [FR] France .................. 92 06319

[51] Int. Cl.$^5$ .................................. B65D 63/00
[52] U.S. Cl. ........................... 24/274 R; 24/19; 24/279
[58] Field of Search .......... 24/274 R, 274 P, 279, 24/19

[56] References Cited

U.S. PATENT DOCUMENTS

| | | | |
|---|---|---|---|
| 1,986,748 | 1/1935 | Pritchard | 24/279 |
| 2,522,494 | 9/1950 | Baldo | 24/19 |
| 3,195,204 | 7/1965 | McKown, Jr. | 24/274 R |
| 4,445,254 | 5/1984 | Allert | 24/274 R |
| 5,063,642 | 11/1991 | Toth | 24/274 R |

FOREIGN PATENT DOCUMENTS 1484749  6/1967  France .................. 24/274 P

Primary Examiner—Victor N. Sakran
Attorney, Agent, or Firm—Marshall & Melhorn

[57] ABSTRACT

This invention relates to a hose clamp constituted by a band of material, generally metal, wound on itself, one of the ends of said band presenting relief elements forming a rack, whilst on the other end is fixed a housing which constitutes the support of a screw which is mounted to pivot about its axis, said screw abutting on a stop axially mobile with respect to the housing against the action of a spring. The spring is constituted by a curved blade, for example in the form of a semi-circle, whose concavity faces the inside of the clamp and whose ends are laterally in contact with the sides of the housing. A first end of said blade is axially fixed to the housing and provided with an opening in which the tail of the screw may slide, whilst the second end of the blade surrounds at least partially the shank of the screw in the vicinity of its head and is mounted to slide with respect to the sides of the housing.

4 Claims, 1 Drawing Sheet

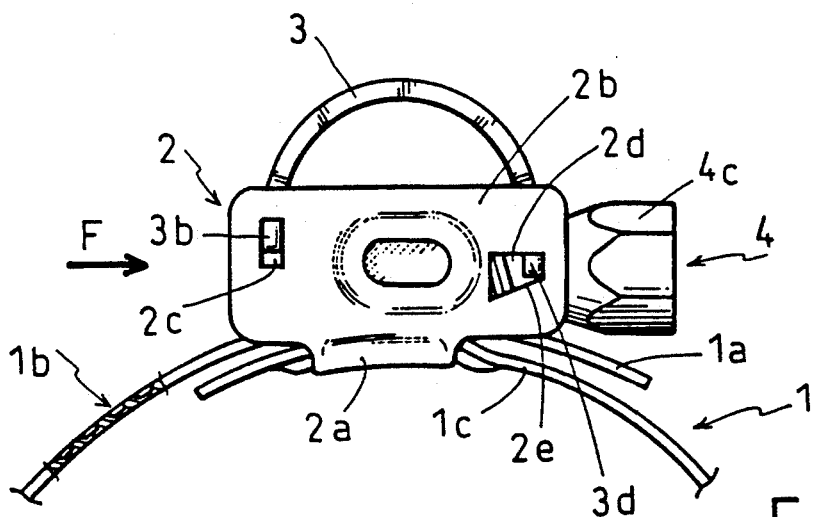
FIG_1
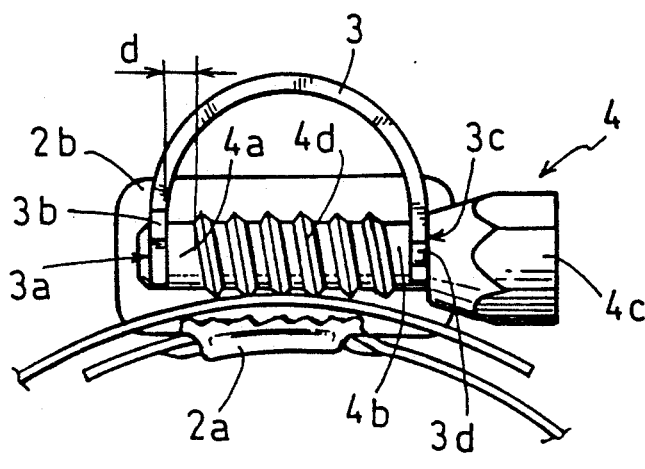
FIG_2
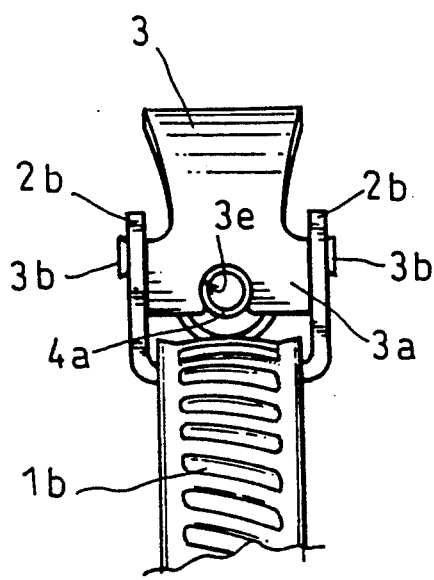
FIG_3

HOSE CLAMP INCORPORATING TIGHTENING SCREW

FIELD OF THE INVENTION

The present invention relates to a hose clamp incorporating tightening screw.

BACKGROUND OF THE INVENTION

A hose clamp is already known, particularly by U.S. Pat. No. 2,522,494 and DE-A-41.08,852 or by published International Applications W080/01199 and W087/00602, which is constituted by a band of flexible material, generally metal, wound on itself. One of the ends of the band presents, at least on its outer surface, a regular succession of crests and/or troughs forming a rack. On the other end of the band is fixed a housing essentially presenting two lateral sides and constituting the support of a screw which is mounted to pivot about its axis. This latter is itself substantially parallel to the longitudinal direction of the band, i.e. to a tangent to the clamp when the band is wound on itself. The longitudinal position of the screw with respect to the housing is variable and determined by at least one stop, axially mobile with respect to the housing, against the action of a spring. On this stop there abuts an appropriate zone of the tail of the screw. In certain cases, the screw is held in the housing thanks to an approximately cylindrical shape of the latter; in other cases, two bearings may be provided, receiving the threaded shank of the screw, respectively near its head and its tail.

Finally, the housing presents a transverse slot via which penetrates the free end of the band whose relief elements come into mesh with the threads of the screw, this allowing the band to be tightened by rotation of the screw with the aid of an appropriate tool.

This type of clamp incorporating tightening screw is much used in industry, particularly if it is desired automatically to compensate a possible reduction in the diameter of the object tightened, but it generally presents at least one serious drawback.

In fact, the known clamps do not allow the clearances to be taken up at the moment of tightening; in certain cases, it may be observed that the threads of the screw are disengaged from the rack of the band, thus preventing continued tightening of the clamp.

It is an object of the present invention to provide a hose clamp incorporating tightening screw of the type which has just been recalled, whose design avoids the drawback which has been set forth hereinbefore.

SUMMARY OF THE INVENTION

According to the invention, the spring is constituted by a curved blade, for example in the form of a semicircle, whose concavity faces the inside of the clamp and whose ends are laterally in contact with the sides of the housing.

A first end of said blade is axially fixed to the housing and is provided with an opening in which the tail of the screw may slide, whilst the second end of the blade surrounds at least partially the shank of the screw in the vicinity of its head and constitutes a stop for said head, this second end being mounted to slide with respect to the sides of the housing.

BRIEF DESCRIPTION OF THE DRAWINGS

The invention will be more readily understood on reading the following description with reference to the accompanying drawings, in which:

FIG. 1 is a view in elevation from the side of a hose clamp according to the invention.

FIG. 2 is a view similar to FIG. 1, a lateral wall of the housing having been torn away.

FIG. 3 is a view in the direction of arrow F of FIG. 1.

DETAILED DESCRIPTION OF THE DRAWINGS

Referring now to the drawings, FIGS. 1 to 3 show a hose clamp incorporating tightening screw, constituted by a generally metal band 1 wound on itself and presenting, at least at its outer end 1a, troughs and crests forming a rack 1b. On the inner end 1c is fixed a housing 2 constituted by a simple U-shaped stirrup of which the web 2a, located in the central zone of the housing, is assembled on the band by any appropriate means, such as welding or riveting, or even by passage of the band in slots in said web.

Between the lateral sides 2b of the housing is disposed a curved blade 3, generally made of spring steel, for example of semi-circular profile, whose concavity faces the inside of the clamp. The ends of the blade are in contact with the sides of the housing and the blade is thus captive therebetween.

A first end, designated by 3a and located to the left in FIGS. 1 and 2, is fixed to the housing. To that end, the blade 3 presents two lateral extensions 3b which penetrate in holes 2c made on each of the sides 2b. The projections of the lateral extension 3b are preferably hammered on the outer face of the walls 2b or present a hook shape to ensure locking thereof on these sides.

At its opposite end 3c, the blade 3 advantageously presents two lateral extensions 3d disposed in elongated slots 2d in the lateral sides 2b of the housing.

In this way, the blade 3 is axially immobilized with respect to the housing 2 at its end 3a, but is axially mobile at its end 3b, at least over the axial length of the slots 2d forming slideway. For reasons which will appear hereinbelow, the lower edge 2e of the slots 2d is advantageously inclined in the direction of the central zone of the housing.

Finally, a screw 4 is disposed between the lateral sides 2b of the housing and its axis is substantially parallel to the web 2a of the housing, i.e. to the longitudinal direction of the band in this region; it is maintained in its housing by the judiciously shaped ends 3a and 3c of the blade 3.

In fact, the end 3a presents an at least partially circular opening 3e, forming bearing, in which is engaged the cylindrical end of the tail 4a of the screw 4. On the other hand, the end 3c is shaped in similar manner and may likewise receive a cylindrical portion 4b of the shank of the screw, located in the vicinity of its head 4c.

It will be emphasized here that the cylindrical portion 4a of the tail of the screw extends, this side of the end 3a of the blade 3, over a certain distance d when the head 4c of the screw is in abutment, before the clamp is tightened, on the mobile end 3c of the blade. In practice, it will be advantageous, for reasons which will be apparent hereinbelow, if the distance d is close to the axial length of the slideway 2d.

Between the inner ends of the cylindrical portions 4a and 4b, the threaded zone 4d of the screw is located.

Band 1 being fixed to housing 2 as described, its outer end 1a is introduced, by the left in FIGS. 1 and 2, in the slot located between web 2a of the housing and the threaded zone 4d of the screw. By rotating screw 4 in the suitable direction, the end 1a advances from left to right and reduces the diameter of the clamp.

When the clamp is mounted on the object to be tightened, the continuing movement of rotation of the screw 4 provokes tightening, the head 4c of the screw abutting on the stop constituted by the end 3c of the blade 3. As tightening becomes more intense, blade 3 deforms under the effect of the force exerted by the screw head 4c on the end 3c, the latter moving somewhat closer to the end 3a fixed to the housing 2.

The characteristics of the blade 3, which thus forms spring, will be determined as a function of the tightening effort which must be applied to the object to be tightened; similarly, the screwing torque exerted on the head of the screw 4 will take into account the desired tightening effort, particularly if it is obtained by means of a motorized screw driver. It is thus possible to limit the tightening effort to any suitable value.

On the other hand, after appropriate screwing, the distance d visible in FIG. 2 will have notably decreased, with the result that blade 3 will be compressed.

If, during use, the diameter of the object tightened were to decrease, blade 3 would tend to resume its initial shape, thus ensuring maintenance of a sufficient clamping.

As the man skilled in the art will already have understood, manufacture of the clamps according to the invention is particularly simple.

The housing essentially presents holes or the like intended to receive the lateral extensions of the ends of the blade to ensure immobilization of one of these ends and to allow axial displacement of the other. The web of the housing and the band of the clamp, as well as the blade and the screw being assembled, these two sub-assemblies are fastened on each other by a simple folding of the lateral sides of the housing; this single operation constitutes the stirrup which imprisons the blade and the screw, the clamp then being ready for use.

However, this operation which may be effected on automatic presses by a succession of folding and stamping operations, nonetheless leaves "clearances" for example for the ends 3a and 3c of the blade between the lateral sides 2b of the housing and for the lateral extensions 3b in the holes 2c. During tightening, the inclination of the threads of the screw with respect to the axis of the band causes a slight lateral displacement of the screw, enabling the clearances to be taken up; simultaneously and especially by reason of the radial point of abutment constituted by the fixed bearing 3e, the deformation of the blade 3 tends to cause the head 4c of the screw to pivot towards the band since the extensions 3d can move in the slideways 2d. Thanks to this effect, the threads of the screw are more and more strongly applied on the rack during tightening. Such pivoting of the head 4c of the screw is facilitated by the inclination of the lower edge of the slideways 4d.

What is claimed is:

1. A hose clamp including a tightening band, one of the ends of the band forming a rack and the other end of the band affixed to a tightening means, wherein the tightening means includes:

a housing affixed to the band;

a screw having a longitudinal axis, said screw having a tail portion at one end and a head portion at the other end, and mounted in said housing in such a fashion to permit pivotal and axial movement of said screw relative to said housing; and a curved spring blade having first and second ends mounted in spaced apart relation to said housing, the first end provided with an opening adapted to receive the tail portion of said screw, the second end provided with an opening to at least partially surround said screw in the vicinity of the head portion thereof, the second end of said spring blade being mounted to said housing to permit relative sliding movement therebetween.

2. The clamp of claim 5, wherein the first end of said blade presents two lateral extensions engaged in holes of complementary shape provided in the lateral sides of said housing.

3. The clamp of claim 5, wherein the second end of said blade presents two lateral extensions engaged in axial slideways formed in the lateral sides of said housing.

4. The clamp of claim 3, wherein the slideways are inclined in the direction centrally of the housing.

* * * * *